US012253215B2

(12) United States Patent
Kumagai et al.

(10) Patent No.: US 12,253,215 B2
(45) Date of Patent: Mar. 18, 2025

(54) METHOD FOR ASSEMBLING GAS CONTAINER AND GAS CONTAINER

(71) Applicant: TOYODA GOSEI CO., LTD., Kiyosu (JP)

(72) Inventors: Takuhiro Kumagai, Aichi-ken (JP); Masahide Kobayashi, Aichi-ken (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 54 days.

(21) Appl. No.: 18/180,987

(22) Filed: Mar. 9, 2023

(65) Prior Publication Data

US 2023/0296207 A1 Sep. 21, 2023

(30) Foreign Application Priority Data

Mar. 18, 2022 (JP) ................................ 2022-044491

(51) Int. Cl.
*F17C 11/00* (2006.01)

(52) U.S. Cl.
CPC ...... *F17C 11/00* (2013.01); *F17C 2201/0109* (2013.01); *F17C 2203/0614* (2013.01); *F17C 2209/22* (2013.01); *F17C 2209/23* (2013.01)

(58) Field of Classification Search
CPC .............. F17C 11/00; F17C 2201/0109; F17C 2209/22; F17C 2209/234; F17C 2209/23; F17C 2203/0614
USPC ................................ 206/6; 220/560.04, 581
See application file for complete search history.

(56) References Cited

U.S. PATENT DOCUMENTS

| | | | | |
|---|---|---|---|---|
| 8,646,597 B2 * | 2/2014 | Yang | F17C 11/005 | 429/515 |
| 2004/0026431 A1 * | 2/2004 | Jones | F17C 1/06 | 220/588 |
| 2012/0132545 A1 * | 5/2012 | Lee | F17C 11/005 | 206/0.6 |
| 2012/0160712 A1 * | 6/2012 | Yang | F17C 11/005 | 206/0.7 |

(Continued)

FOREIGN PATENT DOCUMENTS

| | | | |
|---|---|---|---|
| JP | 2006-177536 A | | 7/2006 |
| KR | 2009102964 | * | 10/2009 |

(Continued)

*Primary Examiner* — Rafael A Ortiz
(74) *Attorney, Agent, or Firm* — Posz Law Group, PLC

(57) ABSTRACT

A gas container includes a tubular container main body formed by a plurality of pieces which include a first dome piece and a second dome piece and are disposed separately in an axial direction, the tubular container main body having an internal space configured to store a gas, a first mouthpiece attached to the first dome piece, a second mouthpiece attached to the second dome piece, a storage member configured to store and release a gas, and a tubular accommodation member disposed in the internal space and having an accommodation space accommodating the storage member. A method for assembling a gas container includes a first step of assembling and fixing the accommodation member to the first mouthpiece attached to the first dome piece, and temporarily assembling the accommodation member to the second mouthpiece attached to the second dome piece, and a second step of connecting the pieces to each other.

4 Claims, 5 Drawing Sheets

(56) References Cited

U.S. PATENT DOCUMENTS

2016/0114521 A1* 4/2016 Palvoelgyi .............. B29C 49/20
264/523

FOREIGN PATENT DOCUMENTS

KR 101472335 * 12/2014
WO WO-2015187864 A1 * 12/2015 .............. F17C 11/00

* cited by examiner

METHOD FOR ASSEMBLING GAS CONTAINER AND GAS CONTAINER

CROSS-REFERENCE TO RELATED APPLICATION

This application is based on and claims priority under 35 USC 119 from Japanese Patent Application No. 2022-044491 filed on Mar. 18, 2022.

TECHNICAL FIELD

The present disclosure relates to a method for assembling a gas container capable of storing and releasing a gas, and a gas container.

BACKGROUND ART

A gas container (for example, JP-A-2006-177536) which is mounted on a vehicle or the like and stores and releases a gas such as hydrogen gas or natural gas is known. The gas container described in JP-A-2006-177536 includes a storage member such as a hydrogen storage alloy. The storage member physically or chemically stores and releases a gas to be stored. The storage member is accommodated and held in an accommodation member disposed in an internal space of a tubular container main body. According to this storage member, it is possible to increase the amount of gas which can be stored in the internal space of the container main body.

The storage member generates heat when storing a gas, and absorbs heat when releasing the gas. A temperature change of the storage member relates to the performance of gas storage. Therefore, when a temperature deviation occurs in the entire storage member, the performance of the storage member cannot be maximized. Therefore, in the gas container described in JP-A-2006-177536, in order to control a temperature of the storage member, a pipe through which a heat exchange medium flows to exchange heat with the storage member is provided.

In the gas container described in JP-A-2006-177536, the accommodation member accommodating the storage member is held on an inner surface of the container main body via a support member in the internal space of the container main body. However, if the support member is used to hold the accommodation member and the storage member in the internal space of the container main body, the structure in the container main body becomes complicated, and it takes time and effort to assemble the accommodation member into the container main body, which may reduce assembling properties.

SUMMARY

The present disclosure has been made in view of the above circumstances, and an object of the present disclosure is to provide a method for assembling a gas container in which an accommodation member can be easily assembled in a container main body of the gas container, and a gas container in which assembly of the accommodation member in the container main body is facilitated.

According to an aspect of the present disclosure, there is provided a method for assembling a gas container, the gas container including: a tubular container main body formed by a plurality of pieces which include a first dome piece and a second dome piece and are disposed separately in an axial direction, the tubular container main body having an internal space configured to store a gas; a first mouthpiece attached to the first dome piece; a second mouthpiece attached to the second dome piece; a storage member configured to store and release a gas; and a tubular accommodation member disposed in the internal space and having an accommodation space accommodating the storage member, the method including: a first step of assembling and fixing the accommodation member to the first mouthpiece attached to the first dome piece, and temporarily assembling the accommodation member to the second mouthpiece attached to the second dome piece; and a second step of connecting the pieces to each other.

According to this configuration, the accommodation member can be easily assembled in the container main body of the gas container.

According to an aspect of the present disclosure, there is provided a gas container including: a tubular container main body formed by a plurality of pieces which include a first dome piece and a second dome piece and are disposed separately in an axial direction, the tubular container main body having an internal space configured to store a gas; a first mouthpiece attached to the first dome piece; a second mouthpiece attached to the second dome piece; a storage member configured to store and release a gas; and a tubular accommodation member disposed in the internal space and having an accommodation space accommodating the storage member, in which: the accommodation member is assembled and fixed to the first mouthpiece attached to the first dome piece, and is assembled to the second mouthpiece attached to the second dome piece and fixed to the second mouthpiece using a fixing member; and the pieces are connected to each other.

According to this configuration, it is possible to implement a gas container in which the accommodation member is easily assembled in the container main body.

DESCRIPTION OF EMBODIMENTS

Hereinafter, a specific embodiment of a gas container and an assembling method thereof according to the present disclosure will be described with reference to FIGS. 1 to 6.

A gas container 1 according to an embodiment is a container which stores a gas and releases the stored gas. The gas container 1 is mounted on a vehicle or the like which uses stored gas as fuel. The gas stored in the gas container 1 may be any type of gas, but is preferably a fuel gas such as hydrogen gas or natural gas. A pressure of the gas which can be stored in the gas container 1 may be any pressure, but may be a high pressure (for example, 100 MPa, or the like). That is, the gas container 1 may be a pressure container or a pressure-resistant container.

Figure 1:
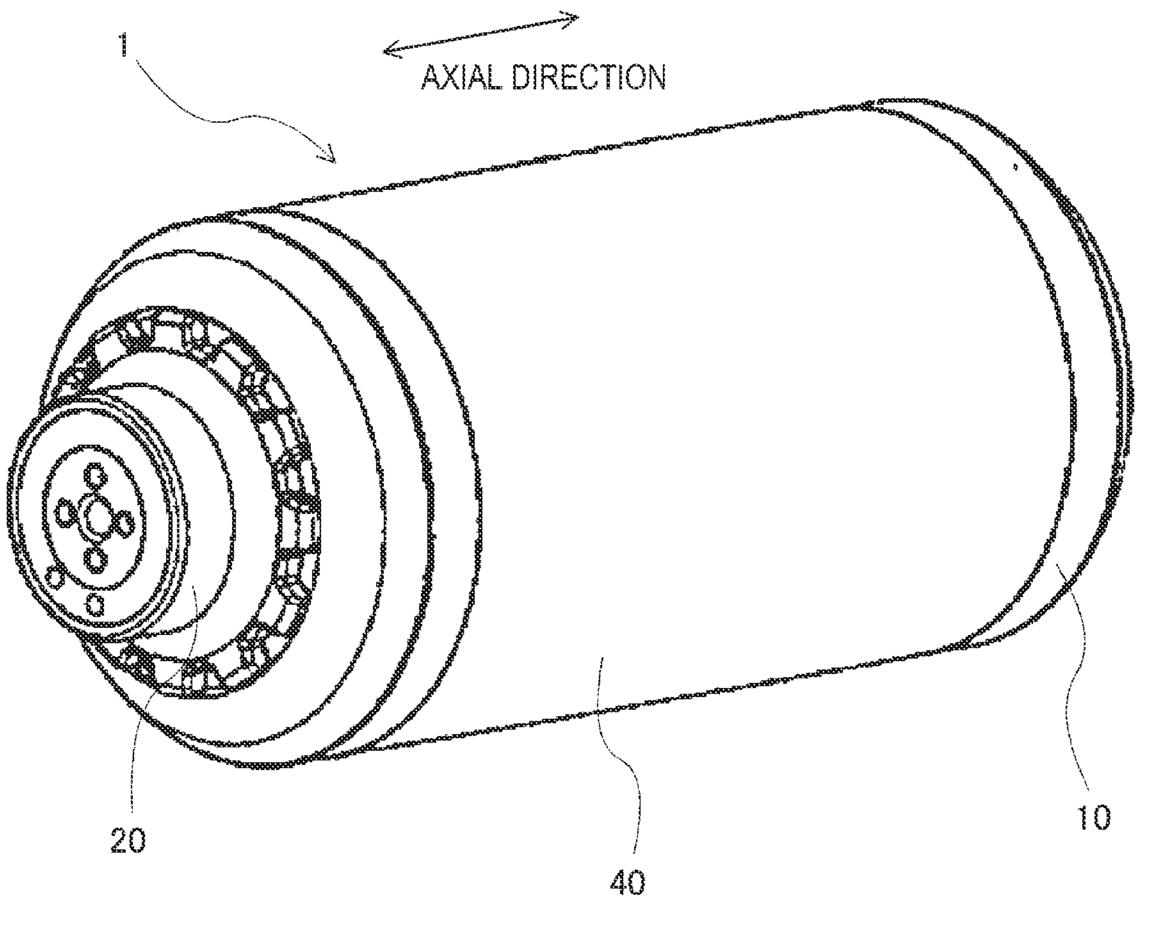
FIG. 1 is a perspective view of a gas container according to an embodiment of the present disclosure.
Figure 2:
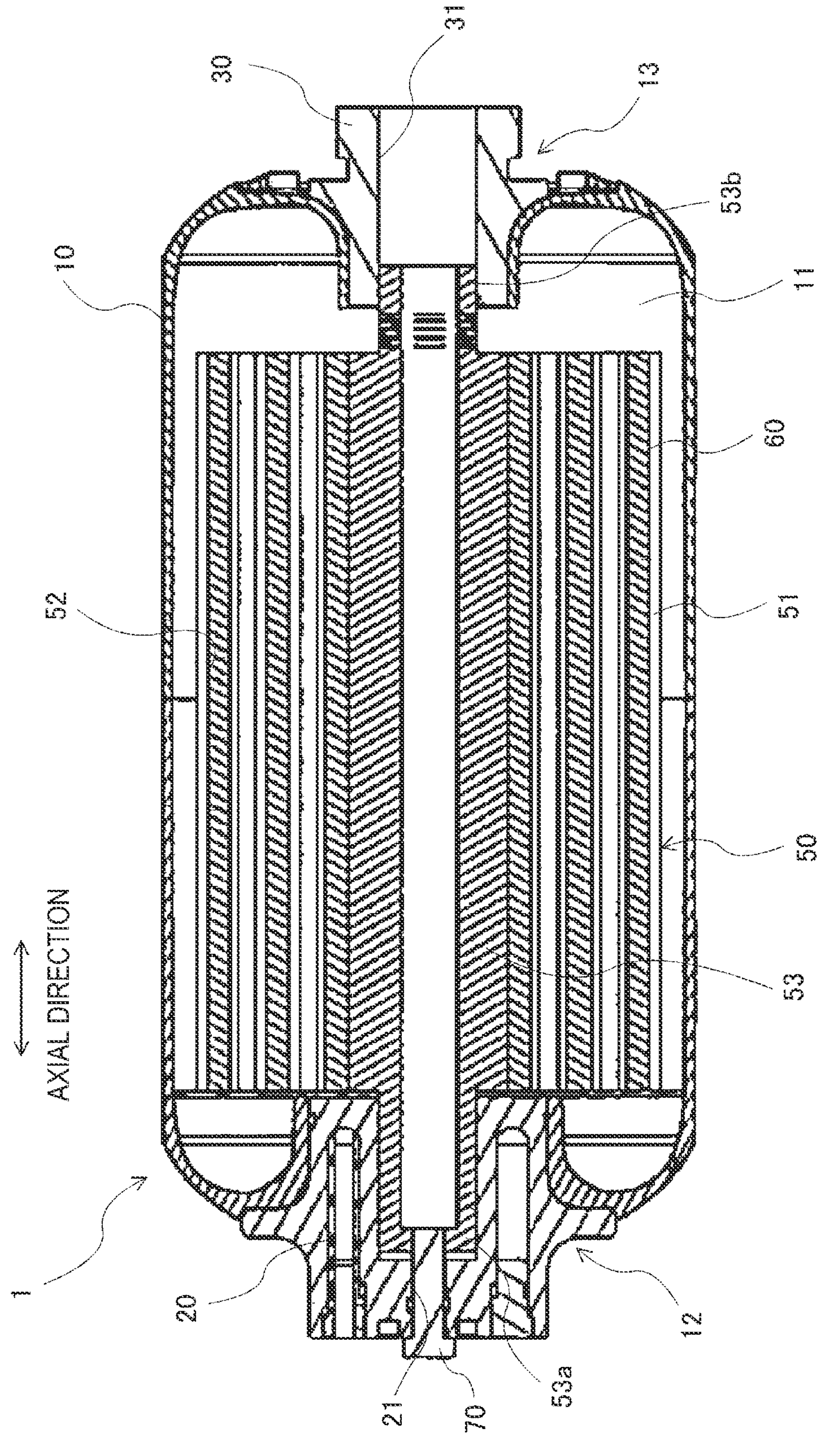
FIG. 2 is a cross-sectional view of the gas container according to the embodiment.
Figure 3:
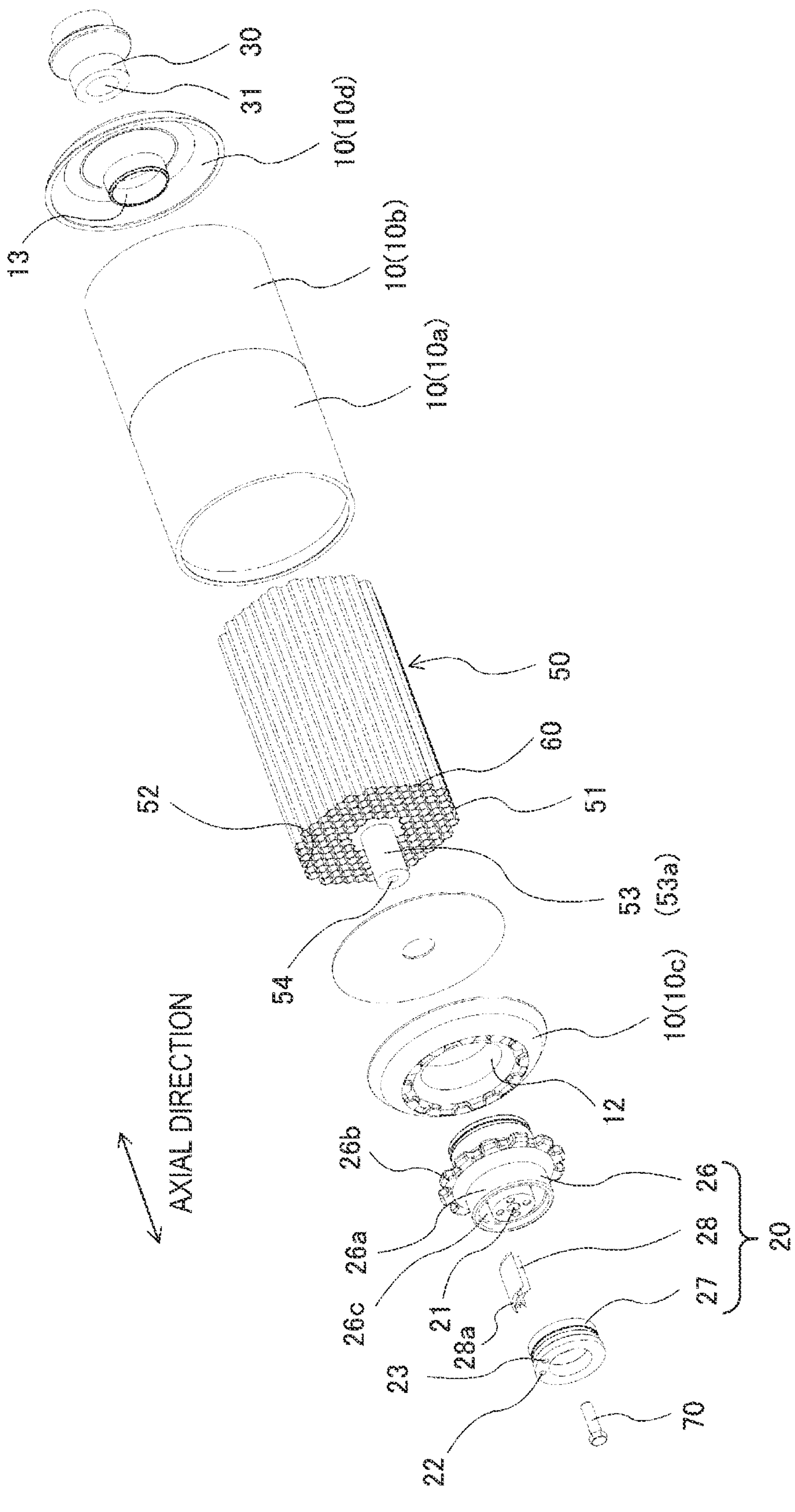
FIG. 3 is an exploded perspective view of the gas container according to the embodiment.

As illustrated in FIGS. 1, 2, and 3, the gas container 1 includes a container main body 10, mouthpieces 20 and 30, a reinforcing member 40, an accommodation member 50, and a storage member 60.

The container main body 10 is a liner for storing a gas. The container main body 10 has an internal space 11. The internal space 11 has a capacity capable of storing a predetermined amount of gas. The container main body 10 is made of a material having gas barrier properties which does not allow or hardly allow a gas stored in the internal space 11 to pass therethrough. The material of the container main body 10 may be selected according to the use environment of the gas container 1 or the like.

For example, when the gas is hydrogen, the material of the container main body 10 is polyethylene resin, polypropylene resin, or the like. The inside of the container main body may be coated with a material having excellent gas barrier properties, such as an ethylene-vinyl alcohol copolymer (EVOH). When the gas container 1 may have a large mass, for example, when the gas container 1 is used for a house, the material of the container main body 10 may be a metal material such as aluminum or stainless steel.

The container main body 10 is formed in a tubular shape to enclose the internal space 11. The container main body 10 is formed in, for example, a cylindrical shape or a regular polygonal cylindrical shape in which the pressure of the gas is uniformly dispersed in the internal space 11. The container main body 10 extends in an axial direction. The container main body 10 is formed so that a diameter of both end portions in the axial direction is reduced from a center side in the axial direction to end sides in the axial direction.

The container main body 10 is formed of a plurality of pieces. The container main body 10 may be formed by connecting and integrating the plurality of pieces by welding, fusion, or the like. For example, as illustrated in FIG. 3, the container main body 10 may be formed of two cylindrical pieces 10*a* and 10*b* having a cylindrical shape and two dome pieces 10*c* and 10*d* having a dome shape. In this case, the container main body 10 may be configured in a state in which the dome piece 10*c*, the cylindrical piece 10*a*, the cylindrical piece 10*b*, and the dome piece 10*d* are disposed in this order from one end side in the axial direction to the other end side in the axial direction. Hereinafter, the dome piece 10*d* is referred to as a first dome piece 10*d*, and the dome piece 10*c* is referred to as a second dome piece 10*c*.

The container main body 10 has opening portions 12 and 13. The opening portion 12 is a portion which opens at one end in the axial direction of the container main body 10. The opening portion 13 is a portion which opens at the other end in the axial direction of the container main body 10. The opening portions 12 and 13 are provided at both end portions in the axial direction of the container main body 10, and are formed in, for example, a circular shape. The mouthpiece 20 is inserted into the opening portion 12. The mouthpiece 30 is inserted into the opening portion 13. Hereinafter, the mouthpiece 30 is referred to as a first mouthpiece 30, and the mouthpiece 20 is referred to as a second mouthpiece 20.

The mouthpieces 20 and 30 are members which allow a gas to flow in and out between the internal space 11 of the container main body 10 and the outside. That is, the mouthpieces 20 and 30 are used for introducing a gas from the outside of the container main body 10 into the internal space 11 and releasing a gas from the internal space 11 to the outside of the container main body 10. The mouthpieces 20 and 30 are attached to the end portions in the axial direction of the container main body 10. A seal member such as an O-ring for preventing leakage of a gas from the internal space 11 of the container main body 10 to the outside is interposed between the mouthpieces 20 and 30 and the container main body 10.

The mouthpieces 20 and 30 have communication passages 21 and 31. The communication passages 21 and 31 are passages which allow the internal space 11 of the container main body 10 to communicate with the outside. The communication passages 21 and 31 extend in the axial direction, and are formed in, for example, a columnar shape. The communication passages 21 and 31 are connected to gas pipes and valves (not illustrated).

The gas container 1 may allow a gas to flow in and out through both the communication passages 21 and 31 of the mouthpieces 20 and 30, or may allow the gas to flow in and out through either one of the communication passages 21 and 31 (specifically, the communication passage 31) and have a plug attached to the other communication passage (specifically, the communication passage 21), as illustrated in FIG. 2. The gas container 1 may be configured such that the second mouthpiece 20 or the first mouthpiece 30 through which a gas flows in and out is attached to either one of the end portions in the axial direction of the container main body 10. The container main body 10 may be formed separately from the mouthpieces 20 and 30, and may be integrated with the mouthpieces 20 and 30 by inserting the mouthpieces 20 and 30 after the formation. The container main body 10 may be integrally molded with the mouthpieces 20 and 30 by, for example, insert molding.

The mouthpieces 20 and 30 function as a heat exchanger through which a heat exchange medium circulates to adjust a temperature of the gas container 1. Although it is preferable that both the mouthpieces 20 and 30 function as heat exchangers, either one of the mouthpieces 20 and 30 may function as a heat exchanger. For example, when a gas flows in and out through one of the mouthpieces (for example, the first mouthpiece 30), the other mouthpiece (for example, the second mouthpiece 20) on the side opposite to the mouthpiece in the axial direction may function as a heat exchanger. Hereinafter, in the present embodiment, a gas flows in and out through the first mouthpiece 30 and the second mouthpiece 20 functions as a heat exchanger.

Figure 4:
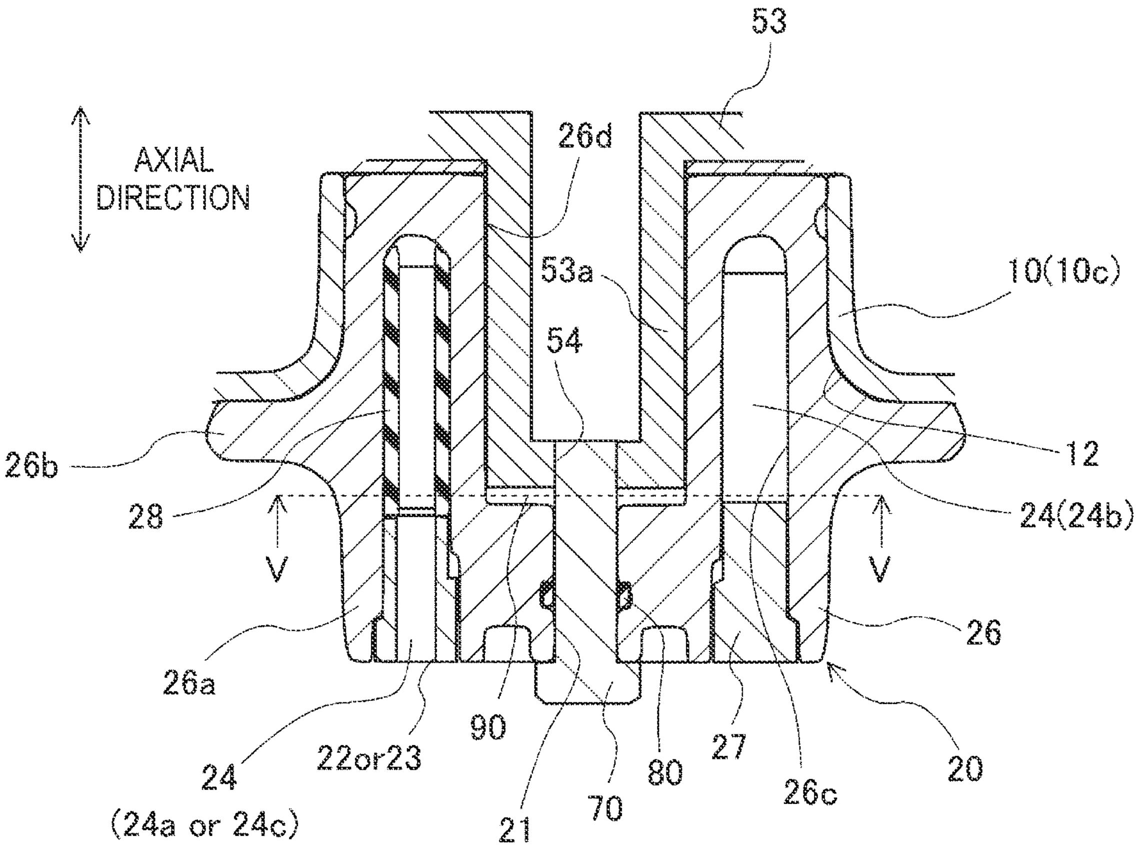
FIG. 4 is a cross-sectional view of a mouthpiece included in the gas container according to the embodiment.
Figure 5:
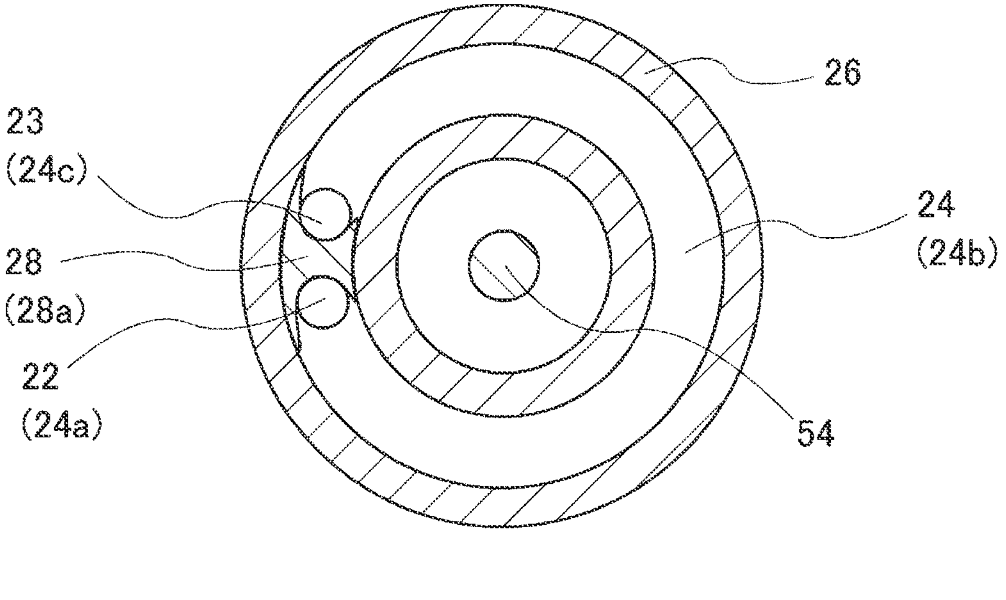
FIG. 5 is a cross-sectional view of the gas container according to the embodiment taken along a line IV-IV illustrated in FIG. 4.

As illustrated in FIGS. 3, 4, and 5, the second mouthpiece 20 includes an inflow port 22, an outflow port 23, and a passage portion 24. The inflow port 22 is an opening portion through which a heat exchange medium flows in from the outside. A storage tank, a pipe, and a valve (none of which are illustrated) provided outside are connected to the inflow port 22. The outflow port 23 is an opening portion through which a heat exchange medium flows out toward the outside. A storage portion and a pipe (none of which are illustrated) provided outside are connected to the outflow port 23. The passage portion 24 is a pipe portion having one end connected to the inflow port 22 and the other end connected to the outflow port 23, and through which a heat exchange medium flows.

The heat exchange medium is a medium which exchanges heat with the internal space 11 of the container main body 10 and the storage member 60, and may be, for example, a liquid such as cooling water. The heat exchange medium flows into the inflow port 22 from the outside, flows through the passage portion 24, and flows out to the outside from the outflow port 23.

The second mouthpiece 20 includes a mouthpiece main body 26 and a lid body 27.

The second mouthpiece 20 may include at least the mouthpiece main body 26 and the lid body 27, and may include a wall body 28 separately. Hereinafter, in the present embodiment, the second mouthpiece 20 includes the wall body 28.

The mouthpiece main body 26 is a main body member of the second mouthpiece 20. The mouthpiece main body 26 is made of a metal such as aluminum or stainless steel to secure rigidity. The mouthpiece main body 26 includes a shaft portion 26*a* and a flange portion 26*b*. The shaft portion 26*a* is a portion extending in the axial direction. The shaft portion 26*a* is formed in a shape (for example, a columnar shape) which fits into the opening portion 12 of the container main body 10. The communication passage 21 described above is provided in an axial central portion of the shaft portion 26*a*. The flange portion 26*b* is a portion which extends in a radial direction. The flange portion 26*b* is integrated with the shaft portion 26*a*. The flange portion 26*b* is formed in a shape along an outer surface of the second dome piece 10*c* of the container main body 10 from an outer surface of the shaft portion 26*a* toward the outside in the radial direction.

A groove portion 26*c* is formed in the mouthpiece main body 26. Specifically, the groove portion 26*c* is formed in an end surface in the axial direction of the shaft portion 26*a* of the mouthpiece main body 26 so as to open outward in the axial direction. A depth in the axial direction of the groove portion 26*c* is set such that the groove portion 26*c* is as close as possible to an end surface in the axial direction on the side opposite to the shaft portion 26*a*. As illustrated in FIGS. 3 and 5, the groove portion 26*c* is formed in an annular shape so as to extend continuously in a circumferential direction around an axial center of the shaft portion 26*a*. A cross section of the groove portion 26*c* may be, for example, a quadrangular shape including a bottom surface and a side surface, or may be a curved semicircular shape.

The lid body 27 is a member which closes the groove portion 26*c* of the mouthpiece main body 26. The lid body 27 is made of a resin such as polyethylene, polypropylene, or polyvinyl chloride having lower thermal conductivity than that of the mouthpiece main body 26. The lid body 27 is formed in an annular shape to match the groove portion 26*c*, and is formed in a tubular shape (for example, a cylindrical shape). A length in the axial direction of the lid body 27 is shorter than the depth in the axial direction of the groove portion 26*c* so that a space is formed between the mouthpiece main body 26 and the lid body 27 in the groove portion 26*c*.

The inflow port 22, the outflow port 23, and the passage portion 24 have a size (for example, an area, a cross-sectional area, a length, or the like) necessary and sufficient to exchange heat between a heat exchange medium and the storage member 60. The inflow port 22 and the outflow port 23 are formed in the lid body 27 (specifically, an end surface in the axial direction of the lid body 27). The inflow port 22 and the outflow port 23 are not disposed at symmetrical positions with respect to the axial center in the lid body 27, but are disposed at asymmetrical positions so as to be close to each other in the circumferential direction. In order to prevent pressure loss of the heat exchange medium due to rapid diameter expansion or diameter reduction of a flow path, it is desirable to gradually increases or reduces a diameter of a flow path in the vicinity of the inflow port 22 or the outflow port 23.

The inflow port 22 and the outflow port 23 communicate with the passage portion 24. The passage portion 24 is formed in the mouthpiece main body 26 and the lid body 27. The passage portion 24 is formed including the space between the mouthpiece main body 26 and the lid body 27 in the groove portion 26*c*. As illustrated in FIGS. 4 and 5, the passage portion 24 includes a first passage portion 24*a*, a second passage portion 24*b*, and a third passage portion 24*c*.

The first passage portion 24*a* is a portion formed in the lid body 27 so as to be continuous with the inflow port 22. The first passage portion 24*a* extends in the axial direction as a through hole penetrating the lid body 27. The second passage portion 24*b* is a portion formed between the mouthpiece main body 26 and the lid body 27 in the groove portion 26*c*. The second passage portion 24*b* is interposed between the first passage portion 24*a* and the third passage portion 24*c*. The second passage portion 24*b* is a space surrounded by the mouthpiece main body 26 and the lid body 27, which remains on an inner side in the axial direction of the groove portion 26*c* when the lid body 27 closes an opening side in the axial direction of the groove portion 26*c* of the mouthpiece main body 26. The passage portion 24 extends in an annular shape around the axial center. The third passage portion 24*c* is a portion formed in the lid body 27 so as to be continuous with the outflow port 23. The third passage portion 24*c* extends in the axial direction as a through hole penetrating the lid body 27.

The wall body 28 is a partition member which partitions a part of the annular groove portion 26*c* to partition the groove portion 26*c* into the inflow port 22 side and the outflow port 23 side. The wall body 28 is disposed at an intermediate position between the inflow port 22 and the outflow port 23 which are adjacent to each other in the circumferential direction in the groove portion 26*c*. The wall body 28 includes a partition portion 28*a*. The partition portion 28*a* closes a part of the groove portion 26*c* to form the C-shaped passage portion 24 around the axial center. The wall body 28 blocks a path having a short distance out of two paths (for example, a clockwise path and a counterclockwise path when viewed from the inflow port 22) connecting the inflow port 22 and the outflow port 23 in the annular groove portion 26*c*, and causes a path having a long distance to function as the passage portion 24.

The wall body 28 is made of a resin such as polyethylene, polypropylene, or polyvinyl chloride having lower thermal conductivity than that of the mouthpiece main body 26. The wall body 28 is formed separately from the mouthpiece main body 26 and the lid body 27. The wall body 28 is attached to at least one of the mouthpiece main body 26 or the lid body 27 and fixed with respect to the mouthpiece main body 26 and the lid body 27 so that the movement of the wall body 28 in the groove portion 26*c* is restricted.

The reinforcing member 40 is a member which reinforces the container main body 10 by covering an outer surface in the radial direction of the container main body 10. The reinforcing member 40 is preferably used particularly when the gas container 1 is a pressure-resistant container. The reinforcing member 40 is made of, for example, high-strength fibers (that is, FRP) impregnated with a resin. The high-strength fibers are carbon fibers, glass fibers, aramid fibers, or the like. Examples of the resin with which the high-strength fibers are impregnated include thermosetting resins such as an epoxy resin, an unsaturated polyester resin, and a vinyl ester resin.

For example, the reinforcing member 40 may be formed as a helical layer or a hoop layer by winding high-strength fibers impregnated with a resin around the outer surface of the container main body 10, or may be formed by attaching a helical layer or a hoop layer formed in a sheet shape using a resin and high-strength fibers to the outer surface of the container main body 10. Further, the reinforcing member 40 may be formed by heating and curing the resin after the helical layer or the hoop layer is formed.

The accommodation member 50 is a member which accommodates the storage member 60, which will be described in detail later. The accommodation member 50 is disposed in the internal space 11 of the container main body 10. The accommodation member 50 is formed in a tubular shape extending in the axial direction of the gas container 1. The accommodation member 50 is formed in a honeycomb shape. The accommodation member 50 includes partition walls 51 and accommodation spaces 52.

The partition wall 51 is a plate-shaped wall portion which partitions the accommodation space 52. The accommodation space 52 is a space accommodating the storage member 60. The storage member 60 is accommodated in the accommodation space 52 and held by the partition wall 51. A plurality of accommodation spaces 52 are provided. The plurality of accommodation spaces 52 are disposed in the radial direction from the axial center and disposed in the radial direction around the axial center so as to form the honeycomb shape of the accommodation member 50.

The accommodation space 52 extends in a columnar shape in the axial direction. A cross section of the accommodation space 52 taken along a plane orthogonal to the axial direction may have a regular polygonal shape such as a regular hexagon. When the cross section of the accommodation space 52 is a regular hexagon, the accommodation space 52 is partitioned by six partition walls 51. A cross-sectional shape of the accommodation space 52 may be constant regardless of the position in the axial direction. All the accommodation spaces 52 may be formed in the same shape as each other, or may be formed in different shapes from each other. The two accommodation spaces 52 adjacent to each other may be partitioned in a state in which the partition walls 51 which partition the respective accommodation spaces 52 are in contact with each other, or may be partitioned by one common partition wall 51.

The partition wall 51 is formed in a shape corresponding to the shape of the accommodation space 52. The partition wall 51 extends in the internal space 11 of the container main body 10 corresponding to the plurality of accommodation spaces 52. The partition wall 51 is made of a heat conductive material and functions as a heat exchanger. The heat conductive material constituting the partition wall 51 is a material having a higher thermal conductivity at room temperature (for example, 25° C.) than that of air, and is specifically a metal, an alloy, ceramics, or the like, and the metal is represented by stainless steel, aluminum, alumina, silicon carbide, or the like.

The partition wall 51 may be formed by integrating plate materials by fusion, adhesion, or the like, or may be formed by extruding and firing a ceramic raw material, or the like. A thickness of the partition wall 51 is preferably not excessively large in order to reduce a weight of the gas container 1 and increase a gas storage amount, and is preferably less than 1 mm, for example.

In addition, the partition wall 51 may have a communication path which connects the accommodation spaces 52 adjacent to each other. The communication path is provided to uniformly spread a gas over the entire internal space 11 to make a gas concentration and heat in the internal space 11 uniform or substantially uniform, thereby improving the gas storage and release performance. One or more communication paths may be provided for each of the partition walls 51, and when two or more communication paths are provided for one partition wall 51, the communication paths may be provided continuously or intermittently so as to be separated from each other in the axial direction.

A central portion of the accommodation member 50 is formed hollow. A coupling portion 53 is integrated with the central portion of the accommodation member 50. The coupling portion 53 is formed in a hollow tubular shape, and extends toward the second mouthpiece 20 side and the first mouthpiece 30 side in the axial direction. One end side in the axial direction of the coupling portion 53, which is the second mouthpiece 20 side, protrudes outward in the axial direction from one end in the axial direction of the accommodation member 50 (specifically, the partition wall 51). In addition, the other end side in the axial direction, which is the first mouthpiece 30 side of the coupling portion 53, protrudes outward in the axial direction from the other end in the axial direction of the accommodation member 50 (specifically, the partition wall 51). The coupling portion 53 is made of the same material as that of the partition wall 51.

The mouthpieces 20 and 30 and the accommodation member 50 have a concave-convex structure in which they are fitted to each other. Specifically, one end side in the axial direction of the coupling portion 53 of the accommodation member 50 is fitted to the mouthpiece main body 26 of the second mouthpiece 20. The one end side in the axial direction of the coupling portion 53 is assembled in contact with the mouthpiece main body 26. The mouthpiece main body 26 has a fitting groove 26*d*. The coupling portion 53 has a fitting convex portion 53*a*.

The fitting groove 26*d* is a groove portion into which the fitting convex portion 53*a* is fitted. The fitting groove 26*d* is formed so as to open in an inner end surface in the axial direction of the shaft portion 26*a* of the mouthpiece main body 26 and extend outward in the axial direction from the opening. The fitting groove 26*d* and the communication passage 21 communicate with each other. A diameter of the fitting groove 26*d* is larger than that of the communication passage 21.

The fitting convex portion 53*a* is a portion to be fitted into the fitting groove 26*d*. The fitting convex portion 53*a* is provided on the one end side in the axial direction of the coupling portion 53. The fitting convex portion 53*a* protrudes in a shaft shape outward in the axial direction from the one end in the axial direction of the accommodation member 50 (specifically, the partition wall 51). In order to apply a surface pressure in the axial direction when connecting (for example, fusion) the pieces 10*a*, 10*b*, 10*c*, and 10*d* of the container main body 10 to each other at the time of assembling the gas container 1, it is desirable that a gap 90 (see FIG. 4) is formed between a distal end face in the axial direction of the fitting convex portion 53*a* and a bottom surface in the axial direction of the fitting groove 26*d* when the accommodation member 50 and the second mouthpiece 20 are temporarily assembled. The gap 90 allows the accommodation member 50 and the second mouthpiece 20 to move relative to each other in the axial direction at least until the second dome piece 10*c* and the cylindrical piece 10*a* come into contact with each other to generate a surface pressure, and may remain after the connection of the pieces 10*a*, 10*b*, 10*c*, and 10*d*.

In addition, in order to ensure the contact between the fitting convex portion 53*a* of the coupling portion 53 and the fitting groove 26*d* of the mouthpiece main body 26, the fitting convex portion 53*a* and the fitting groove 26*d* may be formed in a tapered shape such that a diameter thereof gradually increases or decreases. In order to increase a contact area between the accommodation member 50 and the mouthpiece main body 26, a heat transfer fin may be attached to one end portion in the axial direction of the coupling portion 53 or the accommodation member 50.

As a method for fixing the second mouthpiece 20 and the accommodation member 50 which are fitted to each other by the concave-convex structure, various methods can be adopted. The fixing may be performed by press-fitting, bolt fastening, screwing, welding, fusion, or the like as long as the relative movement between the second mouthpiece 20 and the accommodation member 50 is prevented.

In the present embodiment, the gas container 1 includes a fixing member 70 as illustrated in FIGS. 2, 3, and 4. The fixing member 70 is a member which fixes the second mouthpiece 20 and the accommodation member 50. The fixing member 70 is formed separately from the second mouthpiece 20 and the accommodation member 50. The fixing member 70 is a shaft member on which a male screw is formed. The fitting convex portion 53*a* of the coupling portion 53 of the accommodation member 50 has a hole portion 54. The hole portion 54 is a portion in which a female screw corresponding to the male screw of the fixing member 70 is formed. The hole portion 54 is provided so as to penetrate an end surface portion in the axial direction on one end side in the axial direction of the fitting convex portion 53*a*. The fixing member 70 is inserted into the hole portion 54 of the accommodation member 50 and screwed to the accommodation member 50. The fixing member 70 fixes the second mouthpiece 20 and the accommodation member 50 by being screwed to the accommodation member 50.

The female screw corresponding to the male screw of the fixing member 70 is formed in the hole portion 54 of the accommodation member 50, but instead, the female screw may be formed in a nut member which is separate from the accommodation member 50 and separate from the second mouthpiece 20, and the second mouthpiece 20 and the accommodation member 50 may be fixed by screwing the fixing member 70 and the nut member. Although the fixing member 70 is a shaft member in which a male screw is formed as described above, the fixing member 70 may have a structure capable of fixing the second mouthpiece 20 and the accommodation member 50, and may be, for example, a member which sandwiches the second mouthpiece 20 and the accommodation member 50, instead of the shaft member described above.

The mouthpiece main body 26 of the second mouthpiece 20 has the communication passage 21 provided in the shaft portion 26*a*. As described above, the communication passage 21 is a passage which allows the internal space 11 of the container main body 10 to communicate with the outside. The communication passage 21 is a through hole through which the fixing member 70 is inserted through the mouthpiece main body 26. The fixing member 70 is inserted into the communication passage 21 from the outside of the second mouthpiece 20, and is screwed to the coupling portion 53. The second mouthpiece 20 and the accommodation member 50 are fastened to each other by screwing the male screw of the fixing member 70 and the female screw of the accommodation member 50 (specifically, the hole portion 54 of the fitting convex portion 53*a* of the coupling portion 53) in a state in which the fixing member 70 is inserted into the communication passage 21 of the mouthpiece main body 26.

The other end side in the axial direction of the coupling portion 53 is fitted to the first mouthpiece 30, and is assembled in contact with the first mouthpiece 30. The coupling portion 53 has a fitting convex portion 53*b*. The communication passage 31 of the first mouthpiece 30 constitutes a fitting groove into which the fitting convex portion 53*b* is fitted. The fitting convex portion 53*b* is provided on the other end side in the axial direction of the coupling portion 53. The fitting convex portion 53*b* protrudes in a shaft shape outward in the axial direction from the other end side in the axial direction of the accommodation member 50 (specifically, the partition wall 51).

As a method for fixing the first mouthpiece 30 and the accommodation member 50 which are fitted to each other by a concave-convex structure, various methods can be adopted. The fixing may be performed by press-fitting, bolt fastening, screwing, welding, fusion, or the like as long as the relative movement between the first mouthpiece 30 and the accommodation member 50 is prevented. In the present embodiment, the first mouthpiece 30 and the accommodation member 50 are screwed to each other.

A male screw is formed on an outer surface in the radial direction of the fitting convex portion 53*b* of the coupling portion 53. A female screw is formed on an inner surface in the radial direction of the first mouthpiece 30 which forms the communication passage 31. The first mouthpiece 30 and the accommodation member 50 are fastened to each other by screwing the female screw of the first mouthpiece 30 and the male screw of the fitting convex portion 53*b* of the coupling portion 53.

As illustrated in FIG. 4, the gas container 1 also includes a seal member 80. The seal member 80 is a member which seals the internal space 11 of the container main body 10 from the outside. The seal member 80 is interposed between the fixing member 70 and the mouthpiece main body 26, and seals the internal space 11 in a state in which the fixing member 70 is inserted into the communication passage 21 of the mouthpiece main body 26 of the second mouthpiece 20. The seal member 80 is formed in, for example, an annular shape, and is disposed between an outer surface of a shaft portion of the fixing member 70 and an inner surface constituting the communication passage 21 of the mouthpiece main body 26. The seal member 80 is an O-ring or the like.

The gas container 1 may include a seal member interposed between the mouthpieces 20 and 30 and the accommodation member 50 to seal the internal space 11. For example, the seal member applied to the second mouthpiece 20 side may be disposed between an inner surface in the radial direction of the fitting groove 26*d* of the mouthpiece main body 26 and an outer surface in the radial direction of the fitting convex portion 53*a* of the coupling portion 53, or may be disposed between the inner end surface in the axial direction of the shaft portion 26*a* of the mouthpiece main body 26 and an outer end surface in the axial direction of a general portion of the coupling portion 53. The general portion of the coupling portion 53 refers to a portion having a diameter larger than an outer diameter of the fitting convex portion 53*a*, and specifically refers to a portion which is sandwiched between the fitting convex portion 53*a* and the fitting convex portion 53*b*, positioned in the middle in the axial direction, and fitted into a hollow portion of the accommodation member 50.

The storage member 60 is a member configured to store and release a gas. The storage member 60 is accommodated in the accommodation space 52 and is held by the partition wall 51. The storage member 60 may be accommodated in all the accommodation spaces 52 of the accommodation member 50, or may be accommodated in only a part of the accommodation spaces. The reason why the accommodation space 52 in which the storage member 60 is accommodated is partially limited is that the accommodation space 52 in which the storage member 60 is not accommodated functions as a gas flow path to make the concentration of the gas in the internal space 11 uniform.

The storage member 60 is formed in a columnar shape following the shape of the accommodation space 52. The storage member 60 extends in the axial direction. A cross section of the storage member 60 taken along a plane orthogonal to the axial direction corresponds to the cross section of the accommodation space 52, and may be a regular polygon such as a regular hexagon. The storage member 60 is made of a material corresponding to a type of a gas to be stored. The material of the storage member 60 is, for example, a porous carbon material such as a carbon nanotube, a porous metal complex (that is, MOF), zeolite, a hydrogen storage alloy, a metal hydride, or the like.

The storage member 60 is formed in a state in which powder such as primary particles and secondary particles is solidified, that is, in a pellet shape. According to the pellet-shaped storage member 60, it is possible to secure a large contact area of the storage member 60 with respect to a gas, and thus it is possible to improve the gas storage and release performance. A volume of the storage member 60 is preferably close to 100% of a volume of the accommodation space 52 to secure the gas storage amount, and may be 90% or more. The storage member 60 is formed by crosslinking a storage member powder with a crosslinking agent or binding the powder with a binder. The crosslinking agent and the binder are made of, for example, a silicon-based material, an epoxy-based material, or an amine-based material.

The storage member 60 has the performance which changes in accordance with a position in the axial direction. Specifically, the storage member 60 may be configured such that the breakage resistance of an end portion in the axial direction is higher than that of a center portion in the axial direction. The breakage resistance is an index indicating how difficult it is to pulverize the storage member 60 solidified with a powder. The breakage resistance can be rephrased as strength, rigidity, abrasion resistance, viscosity, elastic force, and the like.

When the amount of a crosslinking agent or the like which crosslinks a material powder of the storage member 60 increases, the amount of the storage member 60 which can be accommodated in the accommodation space 52 decreases by the amount of the crosslinking agent or the like, the amount of the storage member 60 which can store a gas decreases, and the storage and release performance of the storage member 60 decreases. Therefore, in the storage member 60, the higher breakage resistance at the end portion in the axial direction than at the center portion in the axial direction corresponds to lower storage and release performance at the end portion in the axial direction than at the center portion in the axial direction.

Figure 6:
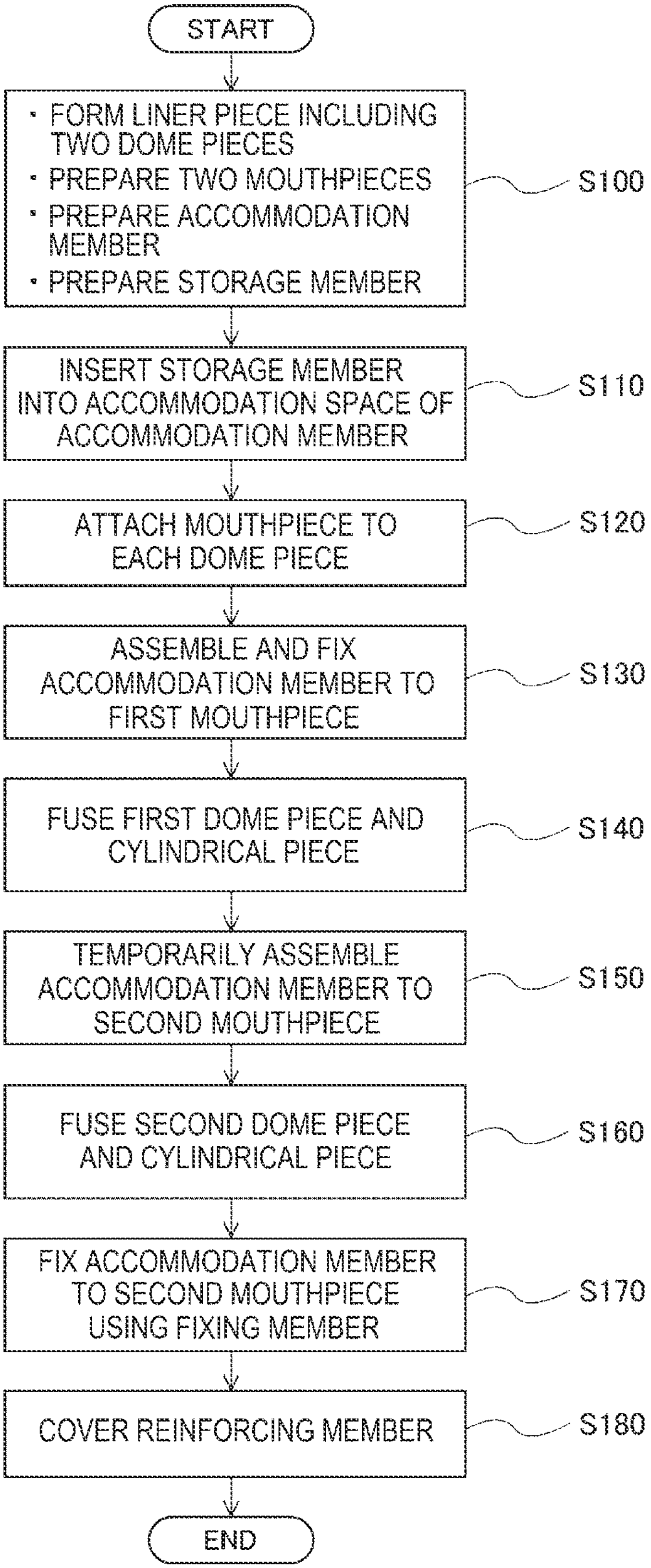
FIG. 6 is a flowchart illustrating an example of a procedure for assembling the gas container of the embodiment.

Hereinafter, an example of a method for assembling and manufacturing the gas container 1 will be described with reference to FIG. 6. The gas container 1 is assembled and manufactured by a predetermined manufacturing device according to the following procedure.

First, the two cylindrical pieces 10*a* and 10*b* and the two dome pieces 10*c* and 10*d* constituting the container main body 10 are prepared by injection molding or the like, and the mouthpieces 20 and 30 are prepared. The honeycomb-shaped accommodation member 50 is prepared, and the pellet-shaped storage member 60 is prepared (step S100 illustrated in FIG. 6). Then, the storage member 60 is inserted into the accommodation space 52 of the accommodation member 50 (step S110). The second mouthpiece 20 is attached to the opening portion 12 of the second dome piece 10*c* together with a seal member, and the first mouthpiece 30 is attached to the opening portion 13 of the first dome piece 10*d* together with a seal member (step S120).

Next, the fitting convex portion 53*b* of the coupling portion 53 of the accommodation member 50 is screwed to the first mouthpiece 30 to be brought into contact with the first mouthpiece 30, and the accommodation member 50 is assembled and fixed to the first mouthpiece 30 (step S130). Then, the first dome piece 10*d* to which the first mouthpiece 30 is attached and the cylindrical pieces 10*b* and 10*a* are connected (for example, fused) while applying a surface pressure in the axial direction (step S140). Thereafter, the fitting convex portion 53*a* of the coupling portion 53 is fitted into the fitting groove 26*d* of the mouthpiece main body 26 to be brought into contact with the second mouthpiece 20, and the accommodation member 50 is temporarily assembled to the second mouthpiece 20 (step S150). Next, the second dome piece 10*c* to which the second mouthpiece 20 is attached and the cylindrical piece 10*a* are connected (for example, fused) while applying a surface pressure in the axial direction (step S160). Then, the fixing member 70 is screwed to the accommodation member 50 to assemble and fix the accommodation member 50 to the second mouthpiece 20 (step S170).

Finally, the outer surface of the container main body 10 is covered with the reinforcing member 40 by a filament winding (FW) method (step S180). Through these processes, the gas container 1 is manufactured.

As described above, in the method for assembling the gas container 1, the second mouthpiece 20 and the accommodation member 50 are temporarily assembled to each other in a state in which the first mouthpiece 30 and the accommodation member 50 are assembled and fixed to each other. In this temporarily assembled state, the second mouthpiece 20 and the second dome piece 10*c* to which the second mouthpiece 20 is attached can move in the axial direction relative to the accommodation member 50 side (that is, including the first mouthpiece 30, the first dome piece 10*d*, and the cylindrical pieces 10*a* and 10*b*) by the gap 90. Then, the second mouthpiece 20 and the second dome piece 10*c* are integrally moved toward the accommodation member 50 side, and the second dome piece 10*c* and the cylindrical piece 10*a* are connected (for example, fused) while being in contact with each other in the axial direction.

In this configuration, it is avoided that all the pieces of the container main body 10 are connected in a state in which both end portions in the axial direction of the accommodation member 50 are fixed to both the first mouthpiece 30 and the second mouthpiece 20. That is, when the second dome piece 10*c* and the cylindrical piece 10*a* are connected in a state in which the accommodation member 50 is assembled and fixed to the first mouthpiece 30 on the first dome piece 10*d* side, the second mouthpiece 20 on the second dome piece 10*c* side is allowed to move relative to the accommodation member 50.

Therefore, it is possible to prevent a positional deviation when connecting the second dome piece 10*c* and the cylindrical piece 10*a* of the container main body 10, it is possible to secure a surface pressure to be applied in the axial direction to a connection portion between the second dome piece 10*c* and the cylindrical piece 10*a*, and it is possible to connect the second dome piece 10*c* and the cylindrical piece 10*a* by fusion or the like while applying the surface pressure in the axial direction. As a result, the rigidity of the container main body 10 can be ensured.

After the second dome piece 10*c* and the cylindrical piece 10*a* are connected to each other, the second mouthpiece 20 and the accommodation member 50, which are temporarily assembled, are finally assembled and fixed to each other using the fixing member 70. In this configuration, the accommodation member 50 is assembled and fixed to the first mouthpiece 30 by screwing, and then fixed to the second mouthpiece 20 using the fixing member 70. Therefore, since the accommodation member 50 can be held and fixed in the internal space 11 of the container main body 10, it is possible to prevent a breakage or an abnormal noise of the accommodation member 50 and the storage member 60 in the container main body 10 due to vibration or the like.

Therefore, according to the method for assembling the gas container 1, the container main body 10 of the gas container 1 can be appropriately configured by connecting the pieces 10*a*, 10*b*, 10*c*, and 10*d*, and the accommodation member 50 can be assembled and held and fixed in the container main body 10.

In this configuration, it is not necessary to use a dedicated support member or the like for holding the accommodation member 50 in the container main body 10. Therefore, it is possible to stably hold the accommodation member 50 with a simple configuration without complicating the structure in the container main body 10. That is, it is possible to facilitate the assembly of the accommodation member 50 in the container main body 10 of the gas container 1.

The operation and action of the gas container 1 will be described.

In the manufactured gas container 1, when a gas is supplied to the internal space 11 of the container main body 10 via the first mouthpiece 30, the gas flows from an end surface in the axial direction on the first mouthpiece 30 side of the accommodation member 50 disposed in the internal space 11 into each of the accommodation spaces 52 of the accommodation member 50 via the hollow coupling portion 53. The gas flowing into the accommodation space 52 flows from the first mouthpiece 30 side to the second mouthpiece 20 side of the accommodation space 52, and is gradually stored in the storage member 60 accommodated and held in the accommodation space 52.

The gas flowing into the accommodation space 52 in which the storage member 60 is not disposed among all the accommodation spaces 52 flows through the accommodation space 52 from the first mouthpiece 30 side to the second mouthpiece 20 side. At this time, in a structure in which the partition wall 51 has a communication path which connects the accommodation spaces 52 adjacent to each other, a part of the gas flowing through the accommodation space 52 flows into the adjacent accommodation space 52 through the communication path.

As described above, in the gas container 1, the entire internal space 11 can be uniformly filled with the gas, and a gas concentration is uniform. In particular, according to a structure in which the storage member 60 is not disposed in a part of the accommodation spaces 52 or a structure in which the above communication path is provided in the partition wall 51, since a gas flow path can extend throughout the entire internal space 11, the gas can be spread throughout the entire internal space 11.

In the gas container 1 described above, the accommodation member 50 which accommodates and holds the storage member 60 is disposed in the internal space 11 of the container main body 10. The accommodation member 50 includes the partition walls 51 which partition the accommodation spaces 52, and is formed in a honeycomb shape in which the partition walls 51 extend such that the plurality of accommodation spaces 52 are regularly disposed in the internal space 11. The storage member 60 is accommodated in the accommodation space 52 and is held by the partition wall 51. The partition wall 51 is made of a heat conductive material. Therefore, since the entire internal space 11 is thermally uniformized, a temperature of the storage member 60 in the internal space 11 is uniformized.

The partition wall 51 is in contact with the mouthpieces 20 and 30 via the coupling portion 53, and is thermally connected to the mouthpieces 20 and 30. In this case, since the partition wall 51 indirectly exchanges heat with the mouthpieces 20 and 30, temperatures of the internal space 11 and the storage member 60 are efficiently and rapidly adjusted. Therefore, according to the gas container 1, it is possible to smoothly store a gas in the storage member 60 and release the gas from the storage member 60 in the internal space 11.

In the gas container 1, the second mouthpiece 20 functions as a heat exchanger through which a heat exchange medium circulates to adjust the temperature of the gas container 1. The mouthpiece main body 26 of the second mouthpiece 20 is made of a metal, and is in contact with the coupling portion 53 of the accommodation member 50 which accommodates and holds the storage member 60. The second mouthpiece 20 includes the inflow port 22 into which the heat exchange medium flows, the outflow port 23 from which the heat exchange medium flows out, and the passage portion 24, one end of which is connected to the inflow port 22 and the other end of which is connected to the outflow port 23, through which the heat exchange medium flows.

In the second mouthpiece 20, the heat exchange medium flows into the inflow port 22 from the outside of the second mouthpiece 20, flows through the passage portion 24, and flows out to the outside of the second mouthpiece 20 from the outflow port 23. When the heat exchange medium circulates through the inside and the outside of the second mouthpiece 20 in this manner, the heat exchange medium exchanges heat with the accommodation member 50 and the storage member 60 in the internal space 11 of the container main body 10. In particular, since the second mouthpiece 20 and the accommodation member 50 are in contact with each other, the heat generated by the storage member 60 is easily transferred to the second mouthpiece 20 through the accommodation member 50, and the heat is easily discharged to the outside through the heat exchange medium.

Therefore, according to the gas container 1, the storage member 60 can be cooled by the circulation of the heat exchange medium through the inside and the outside of the second mouthpiece 20, and the temperature of the storage member 60 can be appropriately controlled. In order to control the temperature of the storage member 60, it is not necessary to dispose, in the internal space 11 of the container main body 10, a pipe through which a heat exchange medium which exchanges heat with the storage member 60 flows.

Therefore, according to the gas container 1, the structure can be simplified in controlling the temperature of the storage member. In addition, since the amount of the storage member 60 can be increased by eliminating a piping space in the internal space 11, the gas storage and release performance using the storage member 60 can be improved by increasing the gas storage amount. Further, the pipe through which the heat exchange medium which exchanges heat with the storage member 60 flows in the gas container 1 is limited to the second mouthpiece 20. Therefore, even if a shape or a size of the container main body 10 (except for a portion where the second mouthpiece 20 is attached) is changed, it is possible to perform heat exchange using the same second mouthpiece 20, that is, it is possible to share the second mouthpiece 20 in performing the heat exchange in many types of container main bodies 10, and it is possible to reduce manufacturing costs of the gas container 1.

In the gas container 1, the second mouthpiece 20 includes the mouthpiece main body 26 in which the groove portion 26*c* is formed, and the lid body 27 which closes the groove portion 26*c*. The inflow port 22 and the outflow port 23 are formed in the lid body 27, and the passage portion 24 is formed including the space between the mouthpiece main body 26 and the lid body 27 in the groove portion 26*c*. Specifically, a part of the passage portion 24 (specifically, the second passage portion 24*b*) is a space which remains behind the groove portion 26*c* when the lid body 27 closes the groove portion 26*c* of the mouthpiece main body 26.

In this configuration, since the passage portion 24 (specifically, the second passage portion 24*b*) can be formed by attaching the lid body 27 in which the inflow port 22, the outflow port 23, the first passage portion 24*a*, and the third passage portion 24*c* are formed to the mouthpiece main body 26 to close the groove portion 26*c* of the mouthpiece main body 26, the structure for causing the second mouthpiece 20 to function as a heat exchanger can be simplified, and the manufacture of the gas container 1 can be facilitated.

In the gas container 1, the groove portion 26*c* formed in the mouthpiece main body 26 is formed in an annular shape around the axial center on the end surface in the axial direction of the shaft portion 26*a* of the mouthpiece main body 26. The second mouthpiece 20 includes the wall body 28 which partitions the groove portion 26*c* into the inflow port 22 side and the outflow port 23 side to form the passage portion 24. In this case, a part of the groove portion 26*c* is closed by the partition portion 28*a* of the wall body 28, so that the C-shaped passage portion 24 is formed around the axial center of the second mouthpiece 20. Therefore, since it is possible to prevent a temperature deviation around the axial center of the second mouthpiece 20, it is possible to adjust the temperature of the storage member 60 efficiently and rapidly, and it is possible to smoothly store and release a gas in the storage member 60.

In the gas container 1, the wall body 28 is provided separately from the mouthpiece main body 26 and the lid body 27, and is made of a resin. According to this configuration, compared to a configuration in which the wall body 28 is made of a metal, heat exchange through the partition portion 28*a* hardly occurs between a relatively cold heat exchange medium which flows from the inflow port 22 to the passage portion 24 (specifically, flows from the first passage portion 24*a* to the second passage portion 24*b*) and a relatively warm heat exchange medium which flows from the passage portion 24 to the outflow port 23 (specifically, flows from the second passage portion 24*b* to the third passage portion 24*c*). Therefore, it is possible to facilitate the heat exchange between the heat exchange medium and the accommodation member 50 and furthermore the storage member 60 in the passage portion 24, and thus it is possible to cool the storage member 60 appropriately and quickly by the circulation of the heat exchange medium, and it is possible to improve the accuracy of the temperature control of the storage member 60.

The lid body 27 is made of a resin similarly to the wall body 28. The lid body 27 closes the groove portion 26*c* of the mouthpiece main body 26 to form the passage portion 24. According to this configuration, compared to a configuration in which the lid body 27 is made of a metal, the temperature of the lid body 27 is prevented from becoming high, and heat is easily transferred from the accommodation member 50 and the storage member 60 to the heat exchange medium in the passage portion 24. Therefore, it is possible to facilitate the heat exchange between the heat exchange medium and the accommodation member 50 and furthermore the storage member 60, and thus it is possible to cool the storage member 60 appropriately and quickly by the circulation of the heat exchange medium, and it is possible to improve the accuracy of the temperature control of the storage member 60.

As described above, according to the gas container 1, the gas storage and release performance of the storage member 60 can be sufficiently utilized, and the storage and release performance can be improved.

In the gas container 1, the second mouthpiece 20 and the accommodation member 50 have a concave-convex structure in which they are fitted to each other, and the first mouthpiece 30 and the accommodation member 50 have a concave-convex structure in which they are fitted to each other. According to such a concave-convex structure, since the mouthpieces 20 and 30 and the accommodation member 50 are fitted to each other, the accommodation member 50 can be held in the internal space 11 of the container main body 10. In addition, it is not necessary to use a dedicated support member or the like for holding the accommodation member 50 in the internal space 11. Therefore, the accommodation member 50 can be stably held without complicating the structure in the container main body 10.

The second mouthpiece 20 and the accommodation member 50 are fixed to each other by the fixing member 70 in a state of being fitted to each other. Specifically, the second mouthpiece 20 and the accommodation member 50 are fastened to each other by screwing the male screw of the fixing member 70 and the female screw of the hole portion 54 of the coupling portion 53 of the accommodation member 50 in a state in which the fixing member 70 is inserted into the communication passage 21 of the mouthpiece main body 26. In this structure, since the second mouthpiece 20 and the accommodation member 50 are fixed to each other by using the fixing member 70, it is possible to prevent the accommodation member 50 from being detached from the second mouthpiece 20.

In the gas container 1, the seal member 80 which seals the internal space 11 is provided between the fixing member 70 and the mouthpiece main body 26 of the second mouthpiece 20. Therefore, in a configuration in which the second mouthpiece 20 and the accommodation member 50 are fastened to each other by screwing the fixing member 70 into the accommodation member 50 in a state in which the fixing member 70 is inserted through the communication passage 21 of the mouthpiece main body 26, it is also possible to prevent a gas in the internal space 11 of the container main body 10 from leaking to the outside from the gap between the fixing member 70 and the mouthpiece main body 26, and it is possible to maintain the airtightness of the internal space 11.

In the above embodiment, the dome pieces 10*c* and 10*d* and the cylindrical pieces 10*a* and 10*b* correspond to “pieces” described in the claims.

In the above embodiment described, the second mouthpiece 20 includes the wall body 28 which partitions the groove portion 26*c* into the inflow port 22 side and the outflow port 23 side, and the wall body 28 is formed separately from the mouthpiece main body 26 and the lid body 27. However, the present invention is not limited thereto, and a wall body which partitions the groove portion 26*c* into the inflow port 22 side and the outflow port 23 side may be formed integrally with the mouthpiece main body 26 or the lid body 27 instead of being separate from the mouthpiece main body 26 and the lid body 27.

In the above modification, in order to make it difficult for heat exchange through the partition portion 28*a* to occur between a relatively cold heat exchange medium flowing from the inflow port 22 to the passage portion 24 and a relatively warm heat exchange medium flowing from the passage portion 24 to the outflow port 23, the wall body is preferably formed integrally with the lid body 27 made of a resin as compared with the mouthpiece main body 26 made of a metal. The wall body which partitions the groove portion 26*c* into the inflow port 22 side and the outflow port 23 side is preferably a member made of a resin, but may be made of a metal instead of a resin, or may be integrally formed with the mouthpiece main body 26.

In the above embodiment, the heat exchange medium flows to the second mouthpiece 20 on the side opposite to the first mouthpiece 30 through which a gas flows in and out. However, the present invention is not limited thereto, and the heat exchange medium may flow through the first mouthpiece 30 through which a gas flows in and out.

In the above embodiment, of the mouthpieces 20 and 30, the mouthpiece through which the heat exchange medium flows is limited to the second mouthpiece 20. However, the present invention is not limited thereto, and the heat exchange medium may flow through both the mouthpieces 20 and 30.

In the above embodiment, the inflow port 22 and the outflow port 23 of the second mouthpiece 20 are formed in the lid body 27. However, the present invention is not limited thereto, and the inflow port 22 and the outflow port 23 of the second mouthpiece 20 may be formed in the mouthpiece main body 26, or may be formed between the mouthpiece main body 26 and the lid body 27.

Further, in the above embodiment, the mouthpiece main body 26 of the second mouthpiece 20 has the fitting groove 26*d*, and the coupling portion 53 of the accommodation member 50 has the fitting convex portion 53*a* to be fitted to the fitting groove 26*d*. However, the present invention is not limited thereto, and conversely, the mouthpiece main body 26 of the second mouthpiece 20 may have a fitting convex portion, and the coupling portion 53 of the accommodation member 50 may have a fitting groove into which the fitting convex portion is fitted.

The present invention is not limited to the above embodiment and the like, and various modifications can be made without departing from the scope of the present invention.

What is claimed is:

1. A gas container, comprising:

a tubular container main body formed by a plurality of pieces which include a first dome piece and a second dome piece and are disposed separately in an axial direction, the tubular container main body having an internal space configured to store a gas;

a first mouthpiece attached to the first dome piece;

a second mouthpiece attached to the second dome piece;

a storage member configured to store and release a gas; and a tubular accommodation member disposed in the internal space and having an accommodation space accommodating the storage member, wherein:

the first mouthpiece, the second mouthpiece, and the accommodation member have a concave-convex structure;

the accommodation member is assembled and fixed to the first mouthpiece attached to the first dome piece, and is assembled to the second mouthpiece attached to the second dome piece and fixed to the second mouthpiece using a fixing member; and the plurality of pieces are connected to each other.

2. The gas container of claim 1, wherein the concave-convex structure comprises:

a first concave portion formed in the first mouthpiece;

a second concave portion formed in the second mouthpiece;

a first convex portion formed on the accommodation member and inserted into the first concave portion; and a second convex portion formed on the accommodation member and inserted into the second concave portion.

3. A gas container, comprising:

a tubular container main body formed by a plurality of pieces which include a first dome piece and a second dome piece and are disposed separately in an axial direction, the tubular container main body having an internal space configured to store a gas;

a first mouthpiece attached to the first dome piece;

a second mouthpiece attached to the second dome piece;

a storage member configured to store and release a gas; and a tubular accommodation member disposed in the internal space and having an accommodation space accommodating the storage member, wherein:

the first mouthpiece includes a communication passage;

the second mouthpiece includes a fitting groove;

the accommodation member includes a first fitting convex portion inserted into the communication passage and a second fitting convex portion inserted into the fitting groove;

the accommodation member is assembled and fixed to the first mouthpiece attached to the first dome piece, and is assembled to the second mouthpiece attached to the second dome piece and fixed to the second mouthpiece using a fixing member; and the plurality of pieces are connected to each other.

4. The gas container of claim 3, wherein the second fitting convex portion includes a hole, and the fixing member is inserted into the hole.

* * * * *